Oct. 30, 1956 G. D. SIMONDS 2,768,538
TRANSFER CASE

Filed May 19, 1954 2 Sheets-Sheet 1

Inventor
GEORGE D. SIMONDS

Wheeler, Wheeler & Wheeler
Attorneys

United States Patent Office 2,768,538
Patented Oct. 30, 1956

2,768,538

TRANSFER CASE

George D. Simonds, Clintonville, Wis., assignor to The Four Wheel Drive Auto Company, Clintonville, Wis., a corporation of Wisconsin Application May 19, 1954, Serial No. 430,850

2 Claims. (Cl. 74—710.5)

This invention relates to improvements in a geared transfer case for four wheel drive vehicles.

This application discloses a novel and practical transfer case for use in vehicles having both front and rear axles driven from a single power source. The said case comprises a combination of a torque dividing differential having bevel side gears of different diameters and inclined differential pinions meshing therewith, a friction disc clutch which is hydraulically actuated and which can lock one driven output shaft to the differential cage thus preventing differential action of the said driven shaft relative to the other driven output shaft, and having constant mesh gears of an easily removable type wherein transfer case gear ratios may readily be changed.

In vehicles having motive power applied to both front and rear axles the greater driving force, i. e. tractive effort, is necessary at the wheels of the axle supporting the greatest load. Since the rear axle generally supports substantially one-half the rated gross weight of a vehicle the torque supplied to it should be divided in this ratio of loading. However, a conventional bevel gear differential having both side gears of equal size always supplies equal torque to both driven shafts. Hence the more lightly loaded front axle has surplus tractive effort which may cause the wheels to slip when the vehicle is loaded to its rated capacity.

A principal object of this invention is to provide an unusually compact, high strength mounting for the torque proportioning differential of a vehicle transfer case.

Another important object of this invention is to provide a compact transfer case having a friction disc clutch which can be hydraulically actuated for the locking of a torque dividing differential. Such a lock can be engaged in a smooth shockless manner thus eliminating the impact forces inherent in engaging jaw type clutches. This friction disc clutch also provides a large measure of protection against part breakage where said clutch is called upon to transmit more torque than its capabilities permit. Herein the discs merely slip where use of a jaw type clutch would result in the breakage of the positive locking elements therein.

Still another important object of the invention is to provide a compact transfer case having removable drive gears thereby allowing the transfer gear ratio of said case to be readily changed and adapted to various specific uses.

Figure 1:
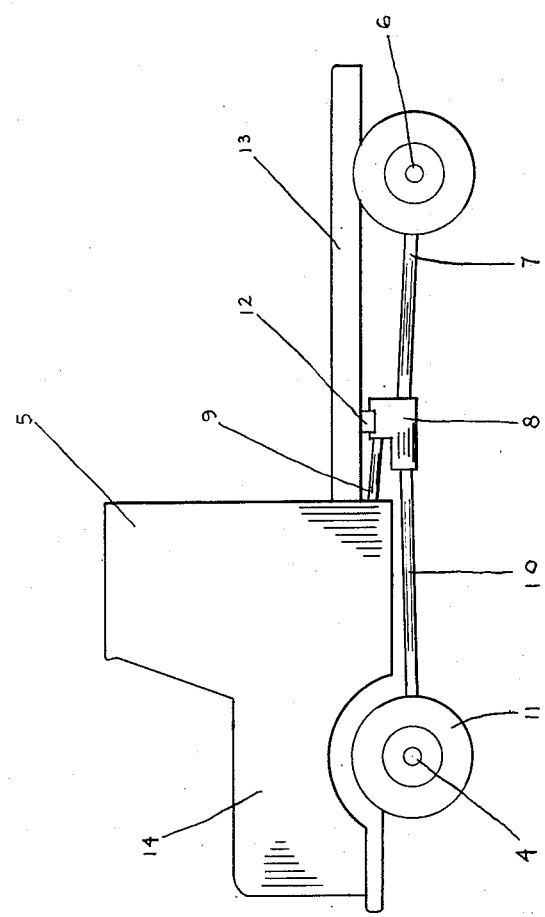
Fig. 1 is a diagrammatic side elevation of a four wheel drive vehicle showing the arrangement of the drive lines and transfer case.

The vehicle frame 13 is provided in a conventional manner with a rear axle 6 which may have single or dual type wheels and a front axle 4 having dirigible wheels. A power source enclosed in the hood 14 of cab 5 drives through a change speed transmission (not shown) which is operatively connected to transfer case 8 by propeller shaft 9. Said transfer case is held to frame 13 intermediate the vehicle axles by bracket 12 and is operatively connected to front and rear live axles through propeller shafts 7 and 10. Transfer case 8 is preferably positioned substantially on the centerline of the vehicle transmission output shaft while the shaft 7 and 10 to the respective axles may slant in any required direction within the limits of the universal points on the shaft ends.

Figure 2:
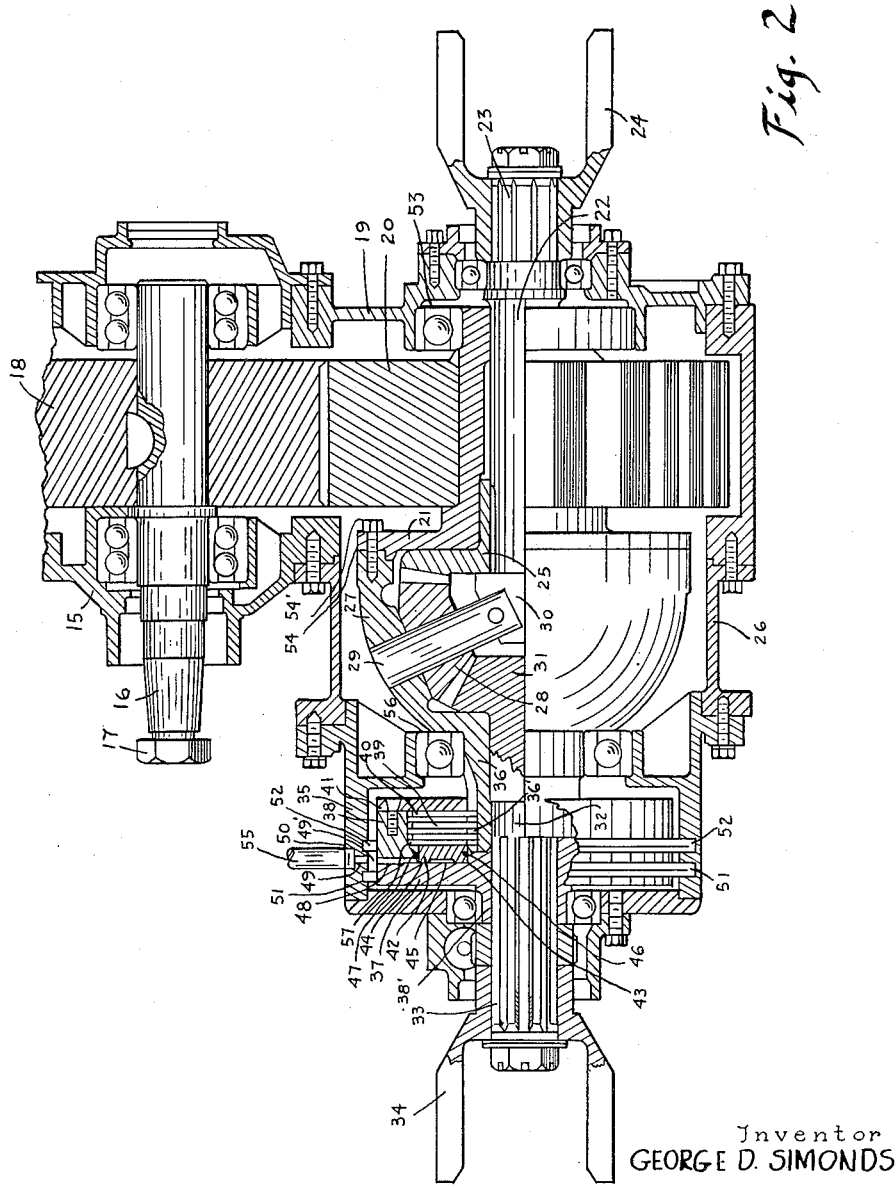
Fig. 2 is a section in a vertical longitudinal plane of the subject transfer case.

Fig. 2 shows transfer case 8 in detail and will now be explained. Upper gear case 15 provides bearing surfaces for input shaft 16. These bearings are preferably of the ball type although rollers or a journal could be used. End 17 of shaft 16 is adapted to receive the yoke of a universal joint thus permitting connection with propeller shaft 9. Gear 18 is keyed or otherwise detachably mounted to input shaft 17 so as to rotate therewith when power is applied to said shaft. Lower gear case 19 contains gear 20 which is supported on sleeve shaft 21 and rotates unitarily therewith, said gear meshing with gear 18.

Said sleeve is supported at its outer end by a bearing 53 having its outer race held in case 19. The inner end of said sleeve is provided with a radial flange 54. A second sleeve 36 has a bell shaped cage 27 which is terminally connected to flange 54 by bolts 54' and is grooved circumferentially with a bearing race supporting notch 56. Stub shaft 29 is supported in cage 27 and extends obliquely toward the interior thereof where its inner end is rigidly held by spider block 30. Differential pinion 28 is mounted for rotation on shaft 29 and meshes with a relatively large differential side gear 25 and a relatively small differential side gear 31. Said large side gear is immediately adjacent radial flange 54 and is splined or otherwise fastened to the end of rear output shaft 22 which extends through sleeve 21 to an output yoke 24. The small side gear aforesaid is unitarily attached to front output shaft 32 which extends through sleeve 36 to a front output yoke 34.

The differential gearing in this invention is of the power proportioning or torque dividing type wherein one side gear is of a larger diameter than the other and the differential pinions are on inclined axes so as to mesh therewith. Herein gear 25 is of such size as to transmit twice the torque to the rear wheels as is given the front wheels through gear 31, however, I do not wish to limit myself to this specific ratio. It can be seen that to use side gears of different diameter the differential pinions must have their axes inclined toward the smaller side gear.

In cases where poor traction is encountered it is desirable to lock the aforementioned transfer case differential such that straight through drive is possible and slippage of either a front or rear wheel will not prevent driving force from being applied at the other axle. This can be done by locking the differential cage to either output shaft thus preventing motion of one relative to the other. This locking has conventionally been done with jaw type clutches. However, in most cases where loss of traction requires a differential lock, jaw type clutches produce undesirable shock when engaged and many times require the vehicle to come to a dead stop before locking can be effected. Jaw type clutches also break when overloaded.

In the present invention I use a hydraulically actuated friction disc clutch mounted in case 35. Sleeve 38' is splined to shaft 32 and provided with a radial flange 37 from the outer periphery of which an internally splined annulus 38 extends, thus forming a clutch cage. Said cage encircles and is concentric with a splined portion 36' of sleeve 36. Clutch disks 39 extend from the sleeves 36 and 38 and intermesh alternately therebetween. Innermost disk 40 on sleeve 36 is in direct contact with a reaction plate 41 which is bolted or otherwise suitably fastened to the annulus 38. Outermost disk 54 on sleeve 36 is in contact with an annular piston 42 which is slidable longitudinally as guided between surfaces 43 and 44.

which constitute the walls of an annular groove formed in the face of flange 37.

Piston 42 constitutes the movable part of a hydraulic motor. Hydraulic fluid, the pressure of which is exerted against the rear face of the piston, is admitted to the annular chamber 45 at the rear of the piston through an annular series of radial ducts 48 in sleeve 38. These ducts open into an annular chamber 49' beyond the periphery of sleeve 38 and defined axially by high speed oil seals 51 and 52. Port 49 communicates from chamber 49' to a hydraulic feed line 55 to which a conventional pump may be connected. Valve means (not shown), under control of the vehicle operator, regulates pressure of the fluid in the line.

The walls 43 and 44 of the annular groove in the face of flange 37 act as a cylinder in which the piston 42 is movable. These walls are desirably provided with O ring seals 46, 47.

Hydraulic pressure on the rear face of piston 42 will press the friction discs 39 into tight contact to lock the sleeve 38 to the bell shaped housing 36. The splined connection of discs 39 to the sleeves 38 and 36 permit limited axial movement of the discs under pressure of the piston. As sleeve 38 is splined to output shaft 32, in turn keyed to small side gear 31, pressure on piston 42 will lock the housing and small side gear 31 together for direct drive from input shaft 17 to output shaft 32.

I claim:

1. A transmission and differential for a motor vehicle having driven front and rear live axles, said transmission comprising aligned driven output shafts and means for connecting said shafts to such axles, a driving sleeve encircling one of said shafts and provided with a radial flange, a sleeve encircling the other of said shafts and having a bell shaped housing terminally connected with said flange, a differential side gear of relatively large radius connected with said one shaft and disposed adjacent said flange, a differential side gear of relatively small radius connected to said other shaft and spaced from said flange, stub shafts connected to the bell-shaped housing and projecting obliquely between the differential side gears aforesaid, differential pinions on the stub shafts meshing with the differential side gears aforesaid, clutch disks connected with said bell-shaped housing, a cage connected with the second driven shaft and provided with clutch disks intermeshing with the clutch disks aforesaid, said cage having an annular groove, a piston in the groove in thrust connection with one of said disks for forcing the disks into frictional bearing engagement, and means for supplying hydraulic pressure to said piston for engaging said clutch disks, whereby to connect said second mentioned driven shaft with said bell shaped housing to restrain differential action therebetween.

2. The device of claim 1 having a housing provided with axially spaced annular packing means encircling the cage for providing closed communication between the housing and cage during cage rotation, said cage having a passage leading from between the packing means to said groove.

References Cited in the file of this patent

UNITED STATES PATENTS

| | | |
|---|---|---|
| 750,424 | Bard | Jan. 26, 1904 |
| 1,466,320 | West | Aug. 28, 1923 |
| 1,610,040 | Clark | Dec. 7, 1926 |
| 1,835,412 | Livingood | Dec. 8, 1931 |
| 1,858,773 | Gurney | May 17, 1932 |
| 2,073,029 | Roller | Mar. 9, 1937 |
| 2,395,108 | Donley | Feb. 19, 1946 |
| 2,559,944 | Chapp | July 10, 1951 |
| 2,580,381 | Banker | Jan. 1, 1952 |

FOREIGN PATENTS

| | | |
|---|---|---|
| 17,944 | Great Britain | Dec. 23, 1915 |
| 465,777 | Italy | Sept. 24, 1951 |